A. LOTON.
BARREL TRUCK.
APPLICATION FILED APR. 29, 1913.

1,124,767.

Patented Jan. 12, 1915.

WITNESSES:

INVENTOR
A. Loton

BY
ATTORNEY

UNITED STATES PATENT OFFICE.

AUGUST LOTON, OF BUFFALO, NEW YORK.

BARREL-TRUCK.

1,124,767.  Specification of Letters Patent.  Patented Jan. 12, 1915.

Application filed April 29, 1913. Serial No. 764,420.

*To all whom it may concern:*

Be it known that I, AUGUST LOTON, a citizen of the United States, residing at Buffalo, in the county of Erie and State of New York, have invented certain new and useful Improvements in Barrel-Trucks, of which the following is a specification.

This invention relates to new and useful improvements in barrel trucks and has for its object the provision of an efficient and satisfactory means for gripping and holding the barrel, taking the form of a clutch adapted to grip and hold a barrel and a means for releasing the same.

As shown, in a specific embodiment of my invention reference is made to the accompanying drawings in which—

Figure 1:
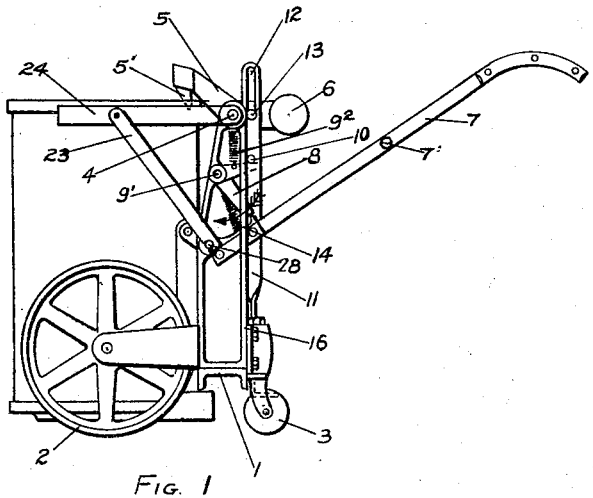
Figure 3:
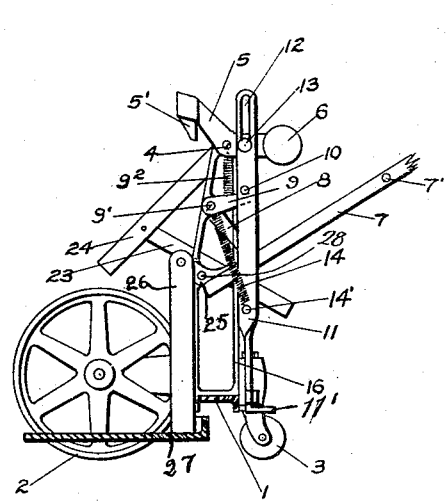
Figure 2:
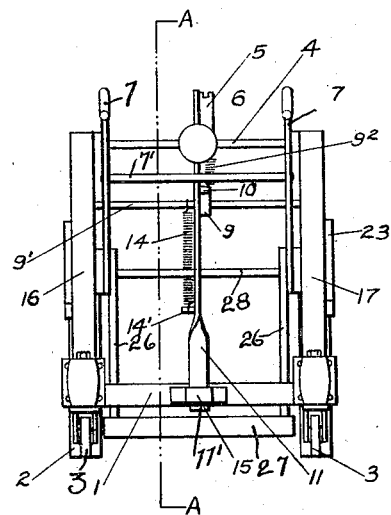

Figure 1 is a side elevation of my truck; Fig. 2 is a rear elevation of the same and Fig. 3 is a section taken on the line A—A of Fig. 2.

Referring to the drawings, in which like characters denote like parts, 1 is a frame supported by the large wheels 2 and the caster wheels 3 and carries uprights 16 and 17. Supported by the uprights and near the top thereof is the cross shaft 4 having the clutch 5 affixed thereto. The clutch 5 has a weighted rear end 6 provided for a purpose hereinafter described. A lever 9 secured to the shaft 9' is normally forced against a pin 10 on the bar 11 by the action of spring $9^2$ secured at one end to cross bar 4 and at the other end to the lever 9. This bar is attached to the clutch 5 to the rear of the pivot thereof by means of a pin 13 on the clutch working in a slot 12 formed in the upper end of the bar 11. An auxiliary spring 14 attached to the shaft 9', and to the bar 11 by the pin 14' is also provided. It will thus be seen that the combined action of springs $9^2$ and 14 force the bar 11 upward causing the latter in turn to force the forward end of the clutch down against the action of the weighted end 6 thereof. Means for restricting the upward movement of the bar 11 is provided by the engagement of its outer bent lower end 11' with the stop 15.

A pair of handles 7 braced apart by any suitable means 7' are attached to one end of the members 25 pivotally swung on the shaft 28. The other ends of the members 25 are attached to the uprights 26 which are in turn directly attached to the bottom tray 27. It will be seen that by moving the handles upward that the upright 26 and consequently the tray 27 are depressed in which position the barrel may be readily placed thereon. After placing the barrel on the tray the handles are depressed and the tray is raised clear of the ground and held in position by a means hereinafter described. The value of this feature will be readily perceived by those familiar with the art.

To prevent the tray being depressed by the weight of the barrel stop pieces 8 are attached to the shaft 9' in line with the movement of the handles. These stop pieces normally engage the handles 7 and prevent upward movement thereof.

To release the clutch and lower the tray the bar 11 is depressed by placing the foot on its outbent end 11' and forcing it down against the tension of the springs $9^2$ and 14. The forward end of the clutch immediately swings upwardly by reason of its heavy weighted rear end. The downward movement of the bar 11 forces the pin 10 thereon against the lever 9, rotating the shaft 9' and swinging the stop pieces 8 in the direction of the arrow in Fig. 1 and out of engagement with the handles, thus permitting the handles and tray to be lowered.

The truck is further equipped with arms 24 as a means to prevent sidewise movement of the barrel when carried by the truck and also for the purpose of guiding the barrel to proper position on the truck. These arms are supported by braces 23 adapted for free engagement of the shaft 28. By simply releasing the braces from the shaft 28 the arms 24 may be swung down out of the way.

Having now described my invention what I claim and desire to secure by Letters Patent is:

1. A barrel truck comprising a frame, supporting wheels therefor, a tray and a clutch carried by said frame, means for locking said tray in a raised position, and means for simultaneously releasing said clutch, and unlocking said tray to allow of downward movement thereof.

2. A device of the type described, comprising a frame, supporting wheels therefor, a clutch carried by the frame, a pair of uprights, a tray carried by said uprights, a pair of handles, pivoted means connecting said handles with said uprights, stop pieces normally arranged in the path of movement of said handles, and means for altering the position of said stop pieces to allow said handles to be raised and said tray lowered.

3. A device of the type described, comprising a frame, supporting wheels therefor, a tray and a spring clutch carried by said frame, means for locking said tray in a raised position, and means for simultaneously releasing said spring operated clutch and unlocking said tray to allow downward movement thereof.

In testimony whereof I affix my signature in presence of two witnesses.

AUGUST LOTON.

Witnesses:
ELEANOR HANBACH,
T. G. STEWART.

Copies of this patent may be obtained for five cents each, by addressing the "Commissioner of Patents, Washington, D. C."